United States Patent [19]
Tabata et al.

[11] Patent Number: 5,400,747
[45] Date of Patent: Mar. 28, 1995

[54] VALVE TIMING CONTROL APPARATUS FOR INTERNAL COMBUSTION ENGINE

[75] Inventors: Taro Tabata, Harpenden, United Kingdom; Masaaki Shinojima, Kariya, Japan

[73] Assignee: Nippondenso Co., Ltd., Kariya, Japan

[21] Appl. No.: 158,737

[22] Filed: Nov. 30, 1993

[30] Foreign Application Priority Data
Nov. 30, 1992 [JP] Japan ................. 4-320026

[51] Int. Cl.⁶ ............................................. F01L 1/34
[52] U.S. Cl. .............................................. 123/90.17
[58] Field of Search ............. 123/90.15, 90.16, 90.17, 123/90.31

[56] References Cited

U.S. PATENT DOCUMENTS

| | | | |
|---|---|---|---|
| 4,651,684 | 3/1987 | Masuda et al. | 123/90.16 |
| 4,811,698 | 3/1989 | Akasaka et al. | 123/90.17 |
| 4,856,465 | 8/1989 | Denz et al. | 123/90.17 |
| 4,928,640 | 5/1990 | van Vuuren et al. | 123/90.17 |
| 5,184,578 | 2/1993 | Quinn, Jr. et al. | 123/90.17 |

FOREIGN PATENT DOCUMENTS

| | | |
|---|---|---|
| 445555 | 9/1991 | European Pat. Off. |
| 62-78308 | 5/1987 | Japan |
| 1-305112 | 12/1989 | Japan |
| 2-245406 | 10/1990 | Japan |
| 2152193 | 7/1985 | United Kingdom |

*Primary Examiner*—E. Rollins Cross
*Assistant Examiner*—Weilun Lo
*Attorney, Agent, or Firm*—Cushman Darby & Cushman

[57] ABSTRACT

A valve timing control apparatus in an internal combustion engine, designed to improve its controllability by deciding a control value by taking into consideration the number of the internal combustion engine and the direction to which the valve timing is to be changed, said valve timing control apparatus which changes the valve timing by changing the rotational phase of the camshaft with respect to the crankshaft comprising: means for detecting the operating condition of the internal combustion engine; means for deciding an optimum timing of the valve from the operating condition detected; means for grasping the present timing of the valve by detecting a phase difference of the camshaft from the crankshaft; and means for causing the present timing to become the optimum timing, wherein there is further provided means for discriminating the direction (advance, retard) to which the valve timing is to be changed from a phase difference between the present timing and the optimum timing in order that the change of direction is reflected in the decision of the control value.

9 Claims, 7 Drawing Sheets

F I G. 1
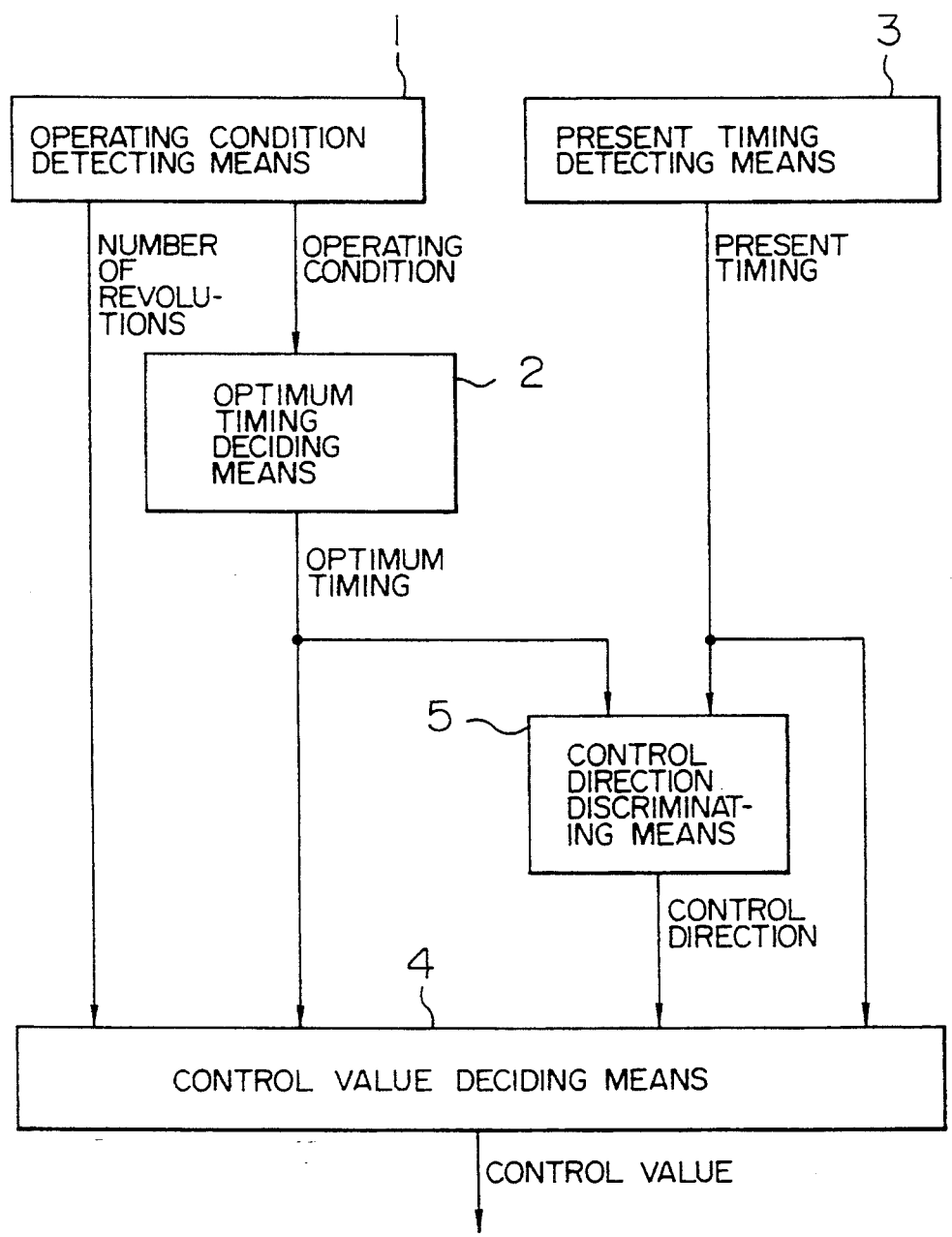

FIG. 6A
CRANKSHAFT ROTATIONAL ANGLE $\theta_1$

IN NON-OPERATING STATE

FIG. 6B
CAMSHAFT ROTATIONAL ANGLE $\theta_2$

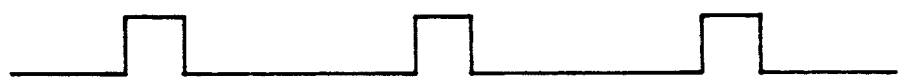

FIG. 6C
CRANKSHAFT ROTATIONAL ANGLE $\theta_1$

WHEN OPERATING (ADVANCING)

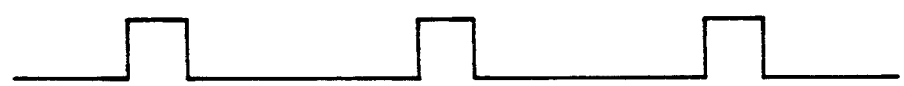

FIG. 6D
CAMSHAFT ROTATIONAL ANGLE $\theta_2$

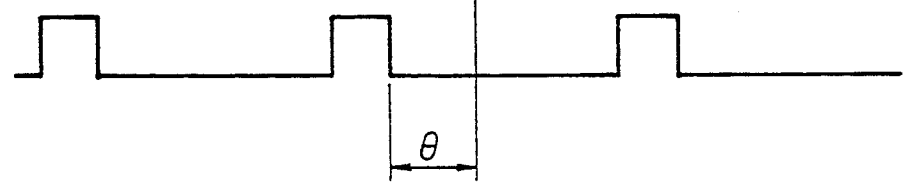

FIG. 7

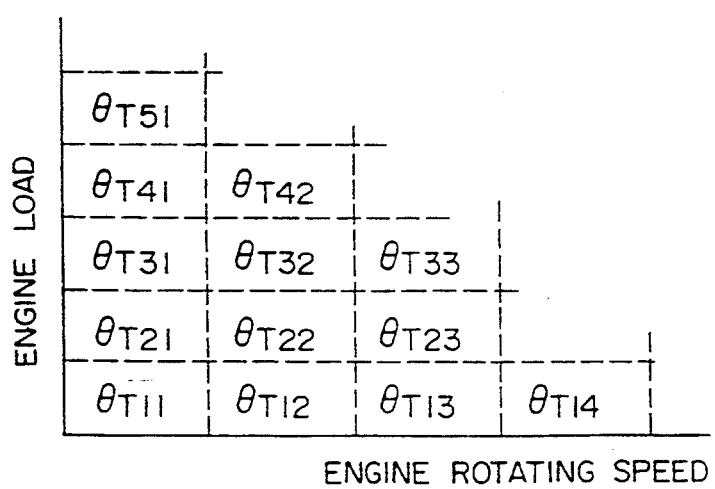

|  |  |  |  |  |
|---|---|---|---|---|
| $\theta_{T51}$ |  |  |  |  |
| $\theta_{T41}$ | $\theta_{T42}$ |  |  |  |
| $\theta_{T31}$ | $\theta_{T32}$ | $\theta_{T33}$ |  |  |
| $\theta_{T21}$ | $\theta_{T22}$ | $\theta_{T23}$ |  |  |
| $\theta_{T11}$ | $\theta_{T12}$ | $\theta_{T13}$ | $\theta_{T14}$ |  |

ENGINE LOAD (vertical axis) / ENGINE ROTATING SPEED (horizontal axis)

VALVE TIMING CONTROL APPARATUS FOR INTERNAL COMBUSTION ENGINE

BACKGROUND OF THE INVENTION

1. Field of the Invention

The present invention relates to a valve timing control apparatus in an internal combustion engine, and more particularly to a valve timing control apparatus for controlling the timing of at least either one of the opening timing and the closing timing of the intake valve and the exhaust valve.

2. Description of the Art

The valve timing control apparatus (hereafter referred to simply as the valve control apparatus) is used to vary, for example, the start timing or the end timing of an intake or exhaust according to the operating condition of the engine to thereby improve the intake efficiency and the exhaust efficiency in the cylinder. To this end, the valve control apparatus performs a control operation so as to change the rotational phase of the camshaft with respect to the crankshaft in order to advance (advance control) or retard (retard control) the timing of at least one of the intake valve and the exhaust valve driven by the cam rotors on the camshaft.

A conventional valve control apparatus is shown in JP-A-61-268810. This apparatus has mounted between the cam pulley rotating synchronously with the crankshaft and the camshaft an intermediate gear which engages both the cam pulley and the camshaft in helical spline engagement. This intermediate gear is arranged so as to be slidable in the direction of the camshaft by a hydraulic pressure and a spring pressure. The engaging portion of the intermediate gear serves to impart a torque to the camshaft, so that the camshaft is rotated in the rotating direction and the relative position of the cam pulley changes with respect to the camshaft.

With respect to a hydraulically-operated valve control apparatus, its hydraulic control method is disclosed in JP-A-1-305112. This method estimates the condition of the hydraulic oil from the working fluid temperature in the hydraulic system, the cooling water temperature and the number of engine revolutions and corrects the hydraulic control value according to the detected condition of the working fluid. By this method, even if the performance of the hydraulic system changes due to a viscosity change of the working fluid and the occurrence of bubbles in the working fluid, the valve control apparatus can control the valves as specified.

However, in the above-mentioned valve control apparatus, if a hydraulic system is used, for example, since the hydraulic system is driven by the motive power of the engine, its performance varies with the number of engine revolutions. Therefore, even if the opening and closing timing of the valve is decided according to the operating condition of the engine, the valve control apparatus suffers errors in the stage of valve operation control and does not have a satisfactory controllability, Conventionally, when performing control to advance or retard the valve opening and closing timing, there has been a difference between the controllability of advance control and the controllability of the retard control. This results from the fact that in valve timing control, to change the rotational phase of the camshaft relative to the crankshaft, for example, a working torque is applied to the camshaft, but the working torque required differs between in advance control and in retard control even when the camshaft is rotated for the same rotational phase. As a result, if the same manner of control is performed in advancing and retarding valve timing, the controllability of either advancing or retarding valve timing or both deteriorates, so that satisfactory valve timing control can not be achieved.

SUMMARY OF THE INVENTION

The present invention has been made to improve the controllability in valve timing control, and has as its first object to realize a constantly stable controllability regardless of the number of engine revolutions and has as its second object to realize the same level of controllability both in advancing and retarding valve timing.

In order to achieve the above objects, technical means shown in FIG. 1 is adopted.

According to this arrangement of the invention, in order to achieve the above-mentioned first object, there is provided a valve timing control apparatus for changing at least one of the opening timing and the closing timing of a valve driven by the camshaft by changing the rotational phase of the camshaft relative to the crankshaft. The valve timing control apparatus comprises operating condition detecting means 1 for detecting the operating condition including the number of revolutions of an internal combustion engine, optimum timing deciding means 2 for deciding the above-mentioned valve timing according to the operating condition, present timing detecting means 3 for detecting the rotational phase difference of the camshaft relative to the crankshaft to thereby detect the present timing of this valve, and control value deciding means 4 for causing the present timing to become the optimum timing by deciding the control value according to the present timing, the optimum timing, and the number of revolutions of the internal combustion engine.

In order to achieve the second object, the valve timing control apparatus further comprises control direction discriminating means 5 for discriminating a direction to which the rotational phase is changed according to a phase difference between the present timing and the optimum timing, and wherein the control value deciding means 4 decides the control value according to the present timing, the optimum timing, and the direction to which the valve timing is to be changed.

Further, in order to achieve both objects mentioned above, the control value deciding means 4 is so arranged as to decide the control value according to the present timing, the optimum timing, the number of revolutions of the internal combustion engine, and the direction to which the valve timing is changed.

According to the above-mentioned form, the operating condition of the internal combustion engine and the performance of the hydraulic pump are estimated from the number of the internal combustion engine. From the estimated operating condition, the optimum timing of the valve action is decided. In the present invention, for decision of the control value to adjust the valve action to an optimum timing, the number of revolutions of the internal combustion engine is introduced as a factor. Accordingly, the control value is obtained which reflects the performance of the hydraulic pump for the whole range of the number of revolutions of the internal combustion engine.

Further, by adding the control direction discriminating means 5 to the arrangement to achieve the first object, a phase control direction to which a changeover is made from the present timing to an optimum timing is decided, and according to this control direction, control values are obtained separately for advance control and retard control.

BRIEF DESCRIPTION OF THE DRAWINGS

FIG. 1 is a block diagram showing an arrangement of the valve timing control apparatus according to the present invention;

FIGS. 6A–6D are time charts showing the relation between a crank position sensor signal and a cam position sensor signal in the first embodiment;

FIG. 7 is a diagram showing an example of a two-dimensional map in the first embodiment.

DESCRIPTION OF THE PREFERRED EMBODIMENTS

Figure 2:
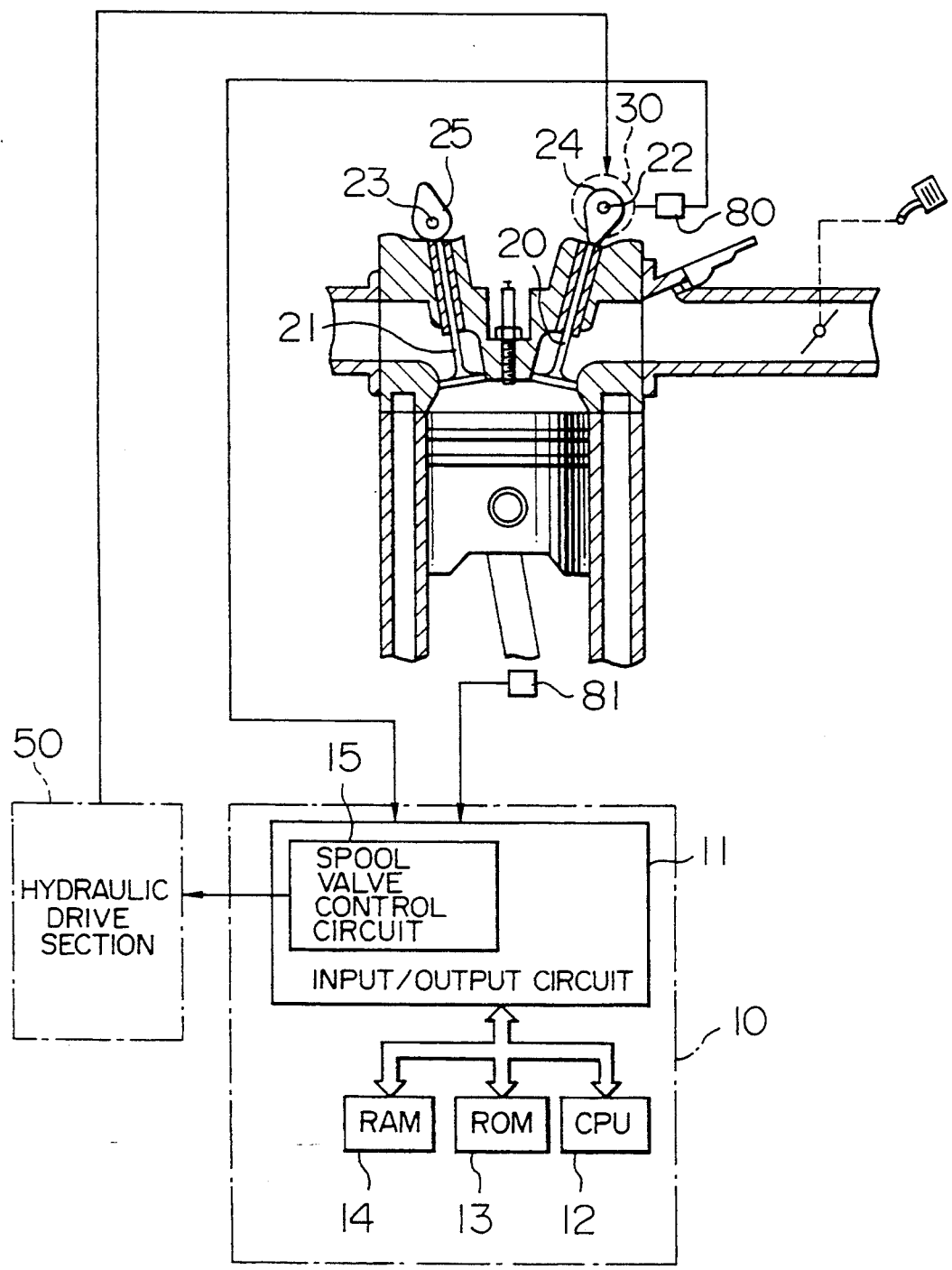
FIG. 2 is a block diagram showing a first embodiment of the present invention.

The construction of a first embodiment of the present invention will be described with reference to FIG. 2.

This embodiment is a valve control apparatus to achieve the first object mentioned above. This apparatus, which controls valve timing by using a hydraulic system, comprises an electronic control unit 10 (hereafter referred to as "ECU"), a valve timing varying section 30, a hydraulic drive section 50, a camshaft angular position sensor 80 (hereafter referred to as "cam position sensor"), and a crankshaft angular position sensor 81 (hereafter referred to as "crank position sensor"), to mention main components only.

ECU 10 includes an input/output circuit 11 for inputting a sensor signal and outputting a control signal, a CPU 12 for deciding an optimum valve timing control value by executing arithmetic operations on an input signal, a ROM 13 for storing a program for the arithmetic operations and its constants, and a RAM 14 for temporarily storing data of the arithmetic operations. The input/output circuit 11 includes a spool valve control circuit 15 for supplying a drive signal to the hydraulic drive section 50 which will be described later.

FIG. 2 shows a twin-cam type engine. The intake valve 20 and the exhaust valve 21 are driven by cam rotors 24, 25 provided separately on camshafts 22, 23. ECU 10 receives a signal from the cam position sensor 80 installed in the vicinity of the camshaft 22, and knows the rotational position of the camshaft 22. ECU 10 receives a signal from the crankshaft position sensor 81 disposed in a lower position of the cylinder, and knows the rotational position of the crankshaft (not shown) and the number of engine revolutions. As the sensors mentioned above, the electromagnetic pick-up type, the magneto-resistive element type, and the optical element type.

ECU 10 knows the load condition of the engine from sensor signals of the throttle opening angle in the exhaust pipe or the accelerator pedal activation degree, engine temperature, etc. At the same time, ECU 10 controls the fuel system and the ignition system, too, but this will not be described here in detail. A control signal from ECU 10 is output to the hydraulic drive section, and by this signal, the quantity of working fluid is decided which is supplied to the valve timing varying section 30 (hereafter referred to simply as "varying section"). This varying section 30, combined with the camshaft 22 or 23, changes the operation timing of the valve 20 or 21. FIG. 2 shows the varying section only at the intake valve 20 for simplicity of description.

Figure 3:
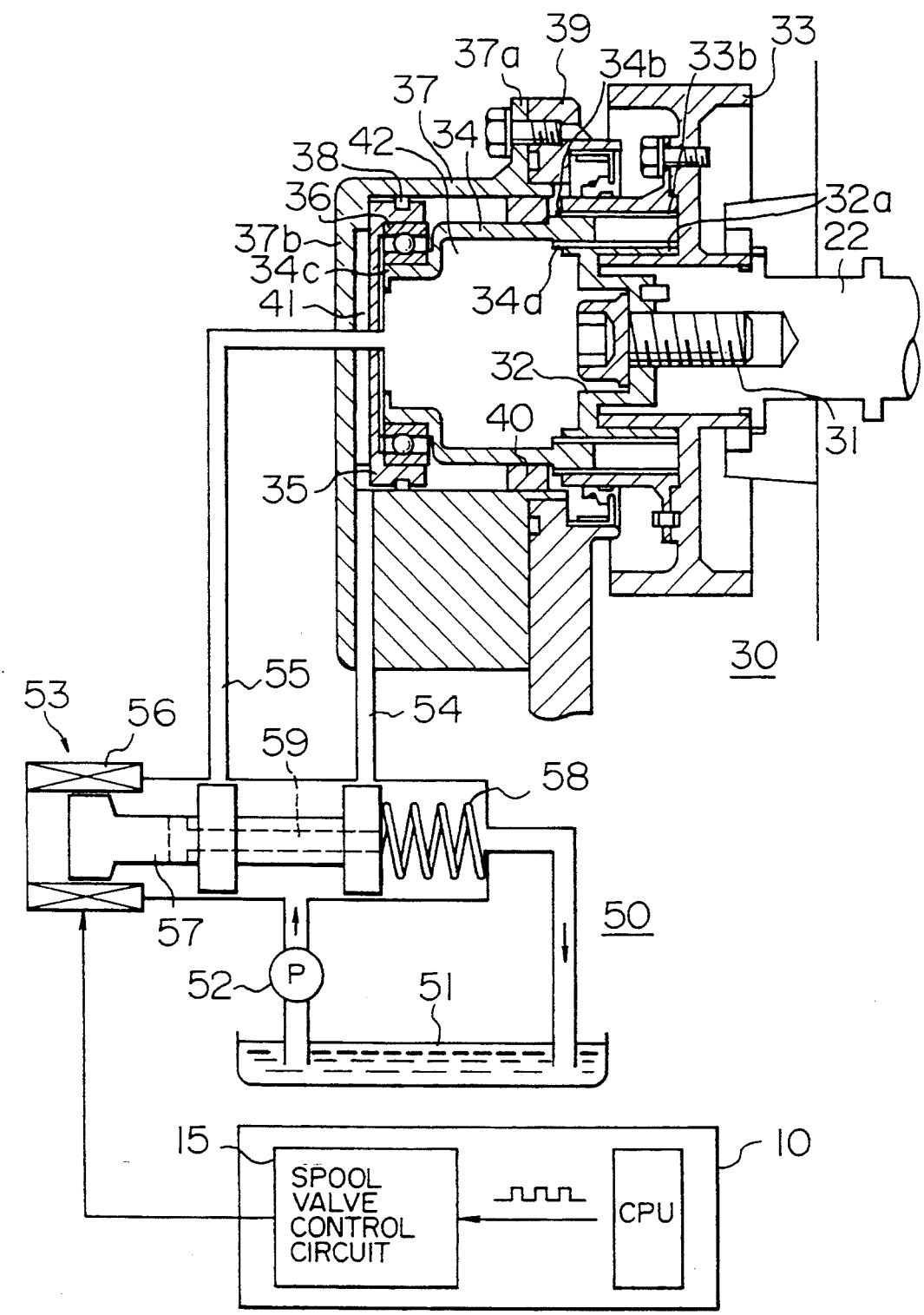
FIG. 3 is a sectional view of the valve timing varying section in the first embodiment.

FIG. 3 shows the construction of this varying section 30. The varying section 30 includes a camshaft member 32 fixed with the camshaft 22 and a bolt 31, a cam pulley 33 fitted slidably in the axial direction of the camshaft between the camshaft 22 and the camshaft member 32, an intermediate shaft member 34 capable of sliding in the axial direction of the camshaft between the camshaft member 32 and the cam pulley 33, and a piston 35 for causing the intermediate shaft member 34 to slide. An external tooth spline 32a is formed as a "helical gear" in the outer circumferential surface of the camshaft member 32, and engages with external splines 34a of the intermediate shaft member 34 in helical engagement.

The intermediate shaft member 34 engages on its outer circumferential surface 34b with internal splines 33b of the cam pulley formed as a "helical gear" in helical engagement. A bearing portion 34c shaped like a small diameter cylinder is formed at one end of the intermediate shaft member 34, and is fitted fixedly with a ball bearing 36. This bearing is fixed to the piston 35. The piston 35 is in a non-rotating state inside an inner wall of a housing 37, and is slidable through a piston ring 38, while keeping an oil-tight state, in the axial direction of the camshaft. A foot portion 37a of the housing is fixed to a stationary portion 39 at the top of the cylinder head with bolts. A bushing metal bearing 40 is mounted inside the housing to support the intermediate shaft member 34. A first hydraulic oil chamber 41 is formed between the housing side wall 37b and the piston, and a second hydraulic oil chamber 42 is formed between the intermediate shaft member 34 and the camshaft member 32. To those hydraulic oil chambers 41, 42, a working fluid is supplied from the hydraulic drive section.

In the above-mentioned construction, normally, the camshaft member 32, the intermediate shaft member 34 and camshaft 22 rotate in synchronism with the crankshaft while they move in a body with the cam pulley 33. Their number of revolutions is ½ of the number of revolutions of the crankshaft. While they rotate, when a working fluid is supplied to the hydraulic oil chamber 41 to cause the intermediate shaft member 34 to slide in the axial direction of the camshaft, a working torque is produced at the helical engaging part. Accordingly, the working torque is applied to the camshaft 22 through the engaging part 34a, causing the camshaft 22 to rotate in its rotating direction. For example, while the camshaft 22 is rotating clockwise, if the intermediate shaft member 34 is caused to slide to the right of the drawing, supposing that the camshaft 22 rotates in its rotating direction, the relative position of the camshaft 22 and the cam pulley 33, that is, their rotational phases change. Therefore, the phase of the camshaft 22 leads on that of the crankshaft, so that the valve timing is advanced. To retard the valve timing, the working fluid is supplied to the hydraulic oil chamber 42 to cause the intermediate shaft member 34 to slide to the left.

Description will then be made of the hydraulic drive section 50 which causes the intermediate shaft member 34 to slide as described above. The hydraulic drive section includes an oil pan 51 a hydraulic pump 52, and a spool valve 53 in the engine. The hydraulic pump 52, detailed description of which is omitted, is of an ordinary type which is driven by the crankshaft to pressure-feed the oil. The working fluid in the oil pan 51 is pressure-fed by the hydraulic pump 52 and supplied through the spool valve 53 to the hydraulic oil chambers 41, 42.

The spool valve 53 opens and closes oil feed pipes 54, 55 by a control signal from ECU 10 to regulate the quantity of the working fluid introduced into the hydraulic oil chambers 41, 42. This control signal is output in a current as a duty signal from a spool valve control circuit 15 in ECU, and supplied to a solenoid coil 56 (hereafter referred to simply as "coil") of the spool valve. The shaft 57 in the spool valve moves in the axial direction according to a present value, and simultaneously while being resisted by a return spring 58 (hereafter referred to simply as "spring") opposing the movement of the shaft, the shaft 57 opens and closes the oil feed pipes 54, 55.

Figure 4A:
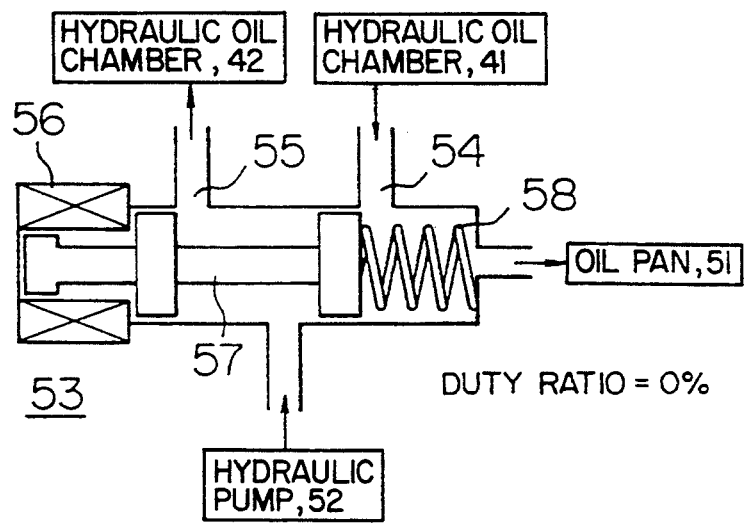
FIGS. 4A, 4B and 4C are diagrams showing the states of an operation of the spool valve in the first embodiment.
Figure 4B:
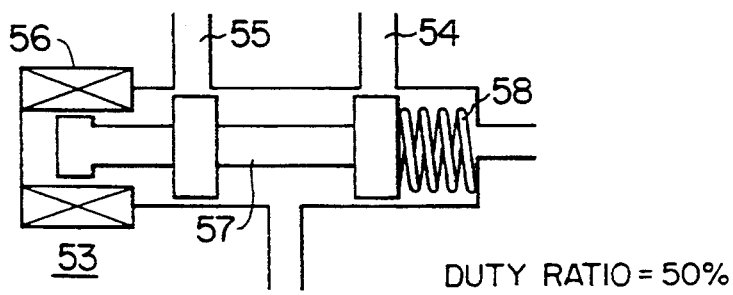
Figure 4C:
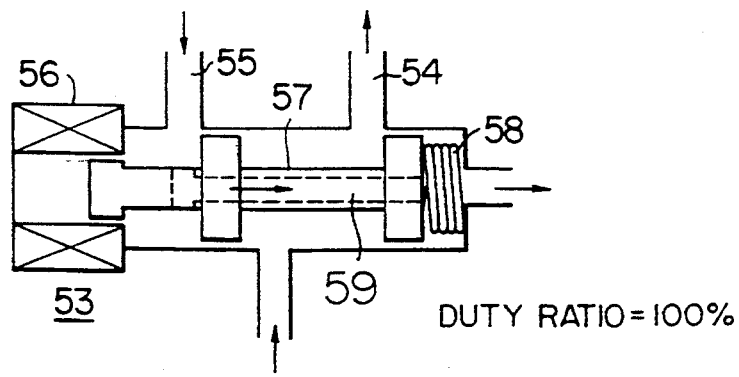

FIGS. 4A, 4B and 4C show examples of operating conditions of the spool valve 53.

FIG. 4A shows a condition when a control signal with a duty ratio of 0% is given. At this time, the shaft 57 is pressed to the left end by the spring 58, so that the working fluid is supplied only to the hydraulic oil pipe 55. Therefore, the working fluid is supplied to the hydraulic oil chamber 42, and the working fluid in the other hydraulic oil chamber 41 is returned through the hydraulic oil pipe 54 to the oil pan 51. As a result, the capacity of the hydraulic oil chamber 42 in FIG. 3 expands, so that the intermediate shaft member slides to the left of the drawing.

FIG. 4B shows the condition when the duty ratio is 50%. In this case, the pushing force by the coil is balanced with the pushing force of the spring, thus keeping the shaft 57 in a position of closing both hydraulic oil pipes 54, 55, and therefore, the hydraulic oil is not supplied to these two hydraulic oil chambers 41, 42, and the sliding mechanism in FIG. 3 maintains the present condition.

FIG. 4C shows the condition when the duty ratio is 100%. In this case, the working fluid is supplied only to the hydraulic oil pipe 54. Consequently, the working fluid is supplied to the hydraulic oil chamber 42 is returned through an oil passage in the shaft 57 to the oil pan 51. As a result, the hydraulic oil chamber in FIG. 3 expands, causing the intermediate shaft member 34 to slide to the right of the drawing.

As has been described, ECU 10 controls the quantity of oil supplied to the respective hydraulic oil chambers by supplying the coil 56 with a control signal while varying the duty ratio minutely.

The values of the duty ratio of 0%, 50% and 100% may vary owing to the characteristics of the coil 56 and the spring 58.

Description will be made of control of the opening timing of the intake valve (i.e. corresponding to control of the closing timing of the intake valve) under the above-mentioned arrangement. This control is performed by PID feedback control, for example. In this embodiment, description is made of the intake valve, but the same description applies to the exhaust valve.

Figure 5:
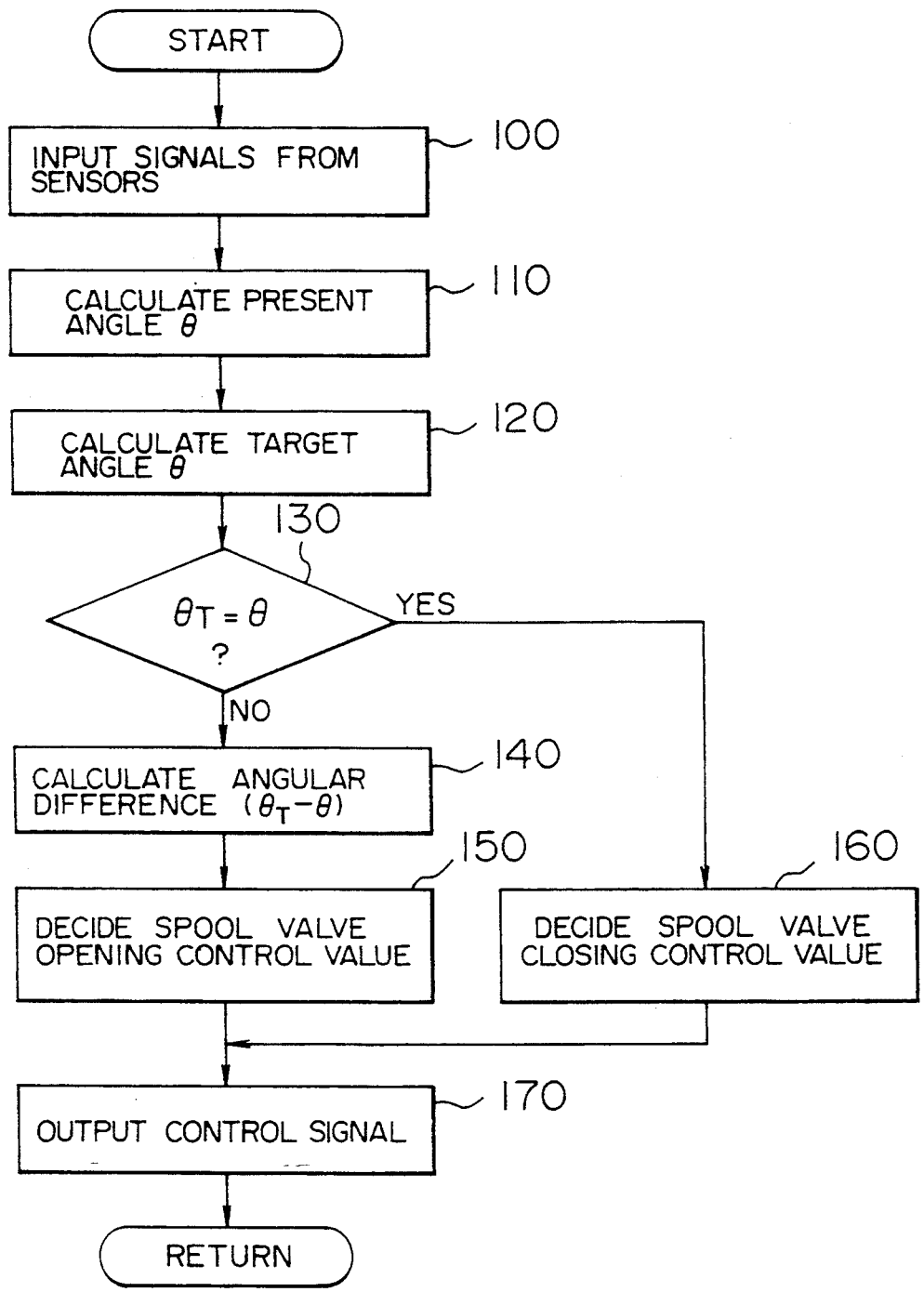
FIG. 5 is a flowchart of the above-mentioned operation in the first embodiment of the present invention.

FIG. 5 is a flowchart of the control, and this routine is executed by interrupt processing at specified time intervals in CPU of ECU.

At step 100, signals of the operating conditions of the engine are input from various sensors, such as the crank position sensor and the cam position sensor. At the next step 110, from those signals, the relative phase difference of the camshaft with respect to the crankshaft is calculated, and a phase angle $\theta$ corresponding to the present opening timing is calculated. This phase angle $\theta$ is calculated from signals which have been waveform-shaped as shown in FIGS. 6A-6D in which FIGS. 6A and 6B respectively show crankshaft and camshaft rotational angles $\Theta_1$ and $\Theta_2$ in a non-operating state while FIG. 6C and 6D respectively show crankshaft and camshaft rotation angles $\Theta_1$ and $\Theta_2$ in an advance operating state. In FIGS. 6A through 6D, the crank rotation angles, for example, are detected in the number of pulses as many as the cylinders for each cycle of the engine, and also the camshaft rotation angles are detected, too, in the number of pulses as many as the cylinder. FIG. 6B shows the condition when the phase difference of the camshaft relative to the crankshaft is $\theta$, that is, the present timing is at advance angle = $\theta$. The electrical delay time (time constant) in waveform shaping is reflected as a correction value to the angle $\theta$.

At step 120, from the values of the signals input at step 100, the present load condition is determined and an angle $\theta_T$ corresponding to an optimum opening timing of the intake valve (hereafter referred to as "target angle") is decided. This target angle is decided by using a two-dimensional map of the number of engine revolutions and the intake air quantity. After the target angle $\theta_T$ is decided, at step 130 the angle $\theta$ calculated at step 110 is compared with the target angle $\theta_T$. At this time, if $\theta_T = \theta$, step 160 is executed, and a control value for closing the two hydraulic oil pipes of the spool valve is decided. If $\theta_T \neq \theta$, at step 140 an angular difference $(\theta_T - \theta)$ is calculated, and at step 150 a control value to reduce this angular difference is decided. Then, the control value is output as a control signal to the coil of the spool valve (step 170).

In this embodiment, the above-mentioned control value is decided as a PID control value, for example, by control inputs "CNTRL" shown in equation (1).

$$\text{CNTRL} = \text{PCNTRL} + \text{ICNTRL} + \text{DCNTRL} \tag{1}$$

where "PCNTRL", "ICNTRL", and "DCNTRL" are respectively control inputs for a proportional control action, an integral control action, and a derivative control action, and they are calculated as follows.

PCNTRL = PGAIN*ERROR
ICNTRL$_{(i)}$ = ICNTRL$_{(i-1)}$ + IGAIN*ERROR
DCNTRL = DGAIN*$\Delta$ERROR The "ERROR" is a difference (error) between the target angle $\theta_T$ and the present angle $\theta$.

The "ERROR" is a variation of "ERROR", and the "$\Delta$ERROR" and "ERROR" are calculated as follows.
ERROR = $\theta_T - \theta$
$\Delta$ERROR = ERROR$_{(i)}$ − ERROR$_{(i-1)}$
i = present
i−1 = previous On the other hand, the "PGAIN", "IGAIN", and "DGAIN" are gains corresponding to a proportional control action, an integral control action, and a derivative control action. Those gains are set according to the number of revolutions of the engine. This is done to solve the problem that when the working oil quantity is controlled which is introduced into the hydraulic oil chambers by the above-mentioned control, the controllability, such as the speed of response, changes owing to a change of the performance of the hydraulic pump with the number of engine revolutions. Those gains are calculated by table interpolation calculations by the number of engine revolutions, and for example, large gains are set for low engine speeds, and small gains are set for high engine speeds.

In the manner as described, at step 150 a feedback control value to approach the target value $\theta_T$ is decided, and is output as a control signal to the spool valve. If the operating condition of the engine changes during its operation and the target angle $\theta_T$ changes at step 120, the control element related to the prior target angle $\theta_T$ is cleared, and a control value to approach a newly-decided target angle $\theta_T$ is decided. In this way, control of an optimum valve opening timing can be achieved with a stable speed of response for the whole range of the numbers of engine revolutions.

A second embodiment of the present invention will then be described.

This embodiment has been made to achieve the second object.

This valve control apparatus, which has a similar construction (not shown) as the first embodiment, further comprises a discriminating section for discriminating the direction to which the valve timing is to be changed from a difference between the above-mentioned angle $\theta$ and target angle $\theta_T$, and an arithmetic section for calculating a control value according to the abovementioned direction. Those additional sections are included in ECU mentioned above.

In this apparatus, too, the control value "CNTRL" is given as a PID control value, for example, and gains for deciding this control value are set as different values according to the directions for changing the valve timing. The reason is as follows.

Normally, when the cam rotor opens the intake valve, the intake valve offers a resisting force (friction) to the cam rotor. This force works in a direction of retarding the rotational phase of the camshaft. Therefore, when changing the direction to a direction for advancing the valve opening timing, the working torque, while resisting this force, has to further rotate the camshaft. Therefore, when advancing the valve opening timing, a greater working torque is required than when retarding the valve opening timing. Accordingly, in advance control, a greater quantity of working fluid needs to be supplied to the hydraulic oil chamber, and therefore, a large control value needs to be set.

Figure 8:
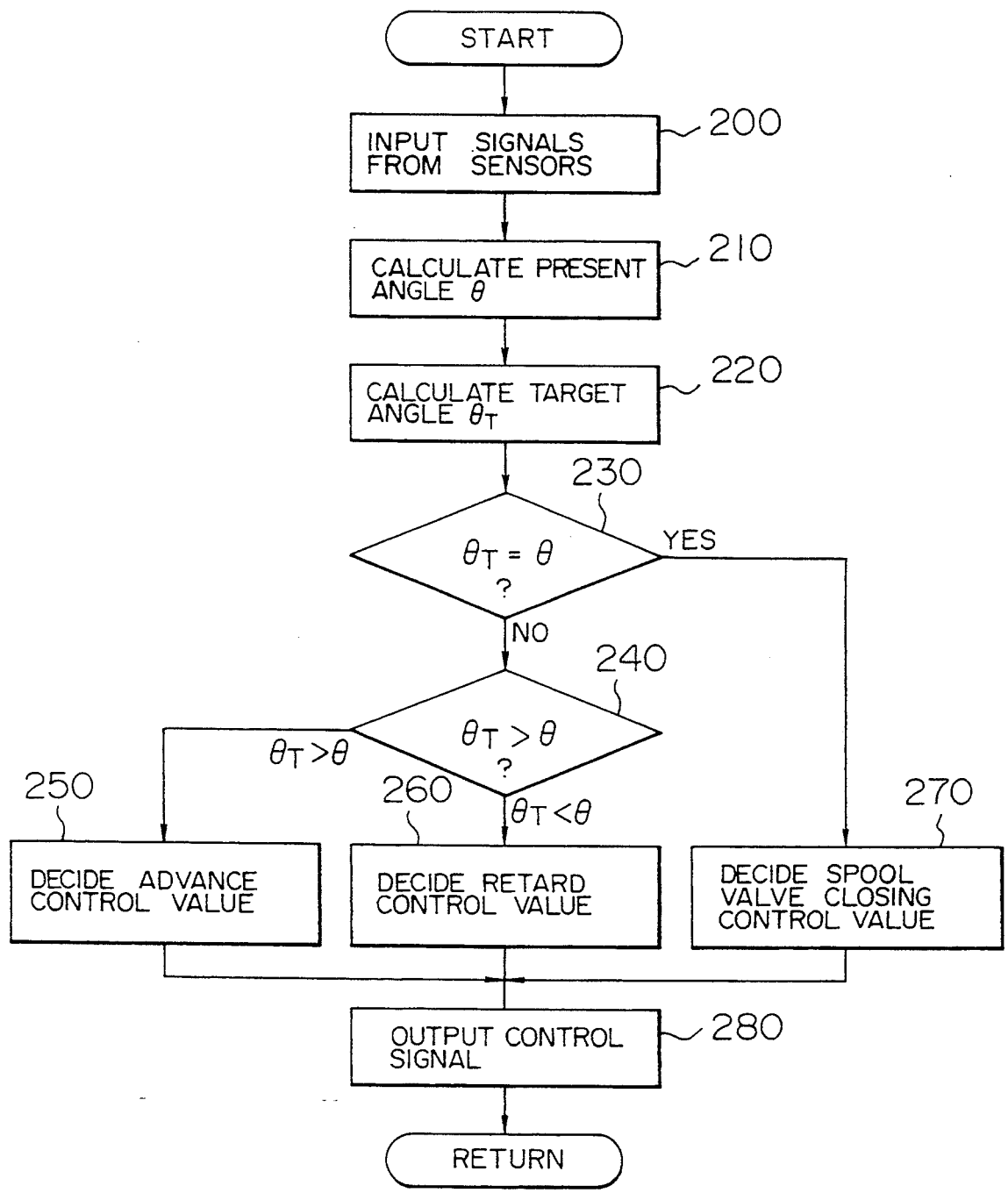
FIG. 8 is a flowchart of an operation in a second embodiment of the present invention.

FIG. 8 is a flowchart of control related to this apparatus.

As in the first embodiment, this routine is executed by interrupt processing at specified time intervals in CPU of ECU. Steps 200 to 230 correspond to steps 100 to 130 in FIG. 5. As is clear from FIG. 5, this flowchart can be combined easily with the flowchart of the first embodiment mentioned above.

After the target angle $\theta_T$ is decided at step 220 in FIG. 8, the present angle $\theta$ is compared with the target angle $\theta_T$ at step 230. If $\theta_T = \theta$, step 270 is executed in which a control value for closing the spool valve to maintain the present valve timing. If $\theta_T \neq \theta$, a decision is made at step 240 whether retard control or advance control is performed according to the angular difference. More specifically, if $\theta_T > \theta$, advance control is decided, and at step 250 an advance control value is decided. If $\theta_T < \theta$, retard control is decided, and at step 260 a retard control value is decided. Those control values decided as described are given as PID control values, and gains for deciding the control values are set and stored in a storage device (ROM) in advance. Even for the same angular difference, a gain for deciding an advance control value is set with a value larger than or equal to a gain for deciding retard control value. A series of those steps is repeated at specified time intervals, and if the target angle $\theta_T$ changes in the course of control, at step 220, the control element related to the prior target angle $\theta_T$ is cleared, and a control value is decided to approach a newly-decided target angle $\theta_T$.

Since, in the way as described, separate control values are decided for advance control and retard control, control of optimum valve opening timing can be achieved with a constantly stable speed of response regardless of the direction of control.

The preferred embodiments of the present invention have been described, and their construction and arrangement may be changed or varied in various ways without departing from the scope of the appended claims.

For example, a combination of the first embodiment and the second embodiment is possible. More specifically, from the two variables, that is, the number of revolutions of an internal combustion engine and the direction to which the rotational phase is to be changed, a control value can be decided to adjust the present timing to an optimum timing.

Further, in the present invention, description has been made of the decision of a control value according to the number of engine revolutions, and the direction of advancing or retarding the valve timing, but the control value can be decided by setting gains according to the engine load (accelerator activation degree), the engine water temperature, and the working fluid temperature.

In this embodiment, the hydraulically-driven varying section is used, but a motor-driven type varying section can be applied.

As described above, since the number of engine revolutions is introduced in the decision of a control value in valve timing control, a stable controllability can be secured for the whole range of the numbers of engine revolutions, and the intake efficiency and the exhaust efficiency in the engine are raised, resulting in an improvement of the engine performance. Accordingly, a less expensive valve control apparatus can be realized without providing the hydraulic pump with an expensive oil pressure regulator. Also, since the direction to which the valve timing is changed is introduced in the decision of the control value, the same level of controllability in advance control and retard control can be realized, and accurate valve opening and closing timing and an accurate overlap cab be achieved. Therefore, the intake efficiency and the exhaust discharge efficiency are raised, resulting in an improved and stabler engine performance.

Further, by combining the above-mentioned two features, the effects of those features can be obtained at the same time, thus producing greater effects.

Further, the angle $\theta$ shown in FIGS. 6A and 6B is a relative phase difference between the crank rotational angle and the camshaft rotational angle, but by obtaining an angular difference (a relative angular difference in the initial state) in advance when the varying section is in non-operating state, the angle $\theta$ may be obtained as a variation of the angular difference obtained previously.

In this embodiment, PID control is used for feedback control, but by using at least one of P-control, I-control, and D-control, the effect of feedback control can be realized. As the control method, modern control may be applied. Other than by changing gains, the control value can be decided by using a correction value or a correction function using a coefficient.

We claim:

1. A valve timing control apparatus for changing at least one of an opening timing and a closing timing of a valve driven by rotation of a camshaft by varying a rotational phase of said camshaft with respect to a crankshaft, said valve timing control apparatus comprising:

means for detecting an operating condition of an internal combustion engine;

means for deciding an optimum timing of said valve according to said operating condition;

means for detecting a rotational phase difference of said camshaft with respect to said crankshaft corresponding to a present timing of said valve;

means for determining a direction to which a rotational phase relationship between said camshaft and said crankshaft is to be changed according to a phase difference between said present timing and said optimum timing of said valve;

control valve means for varying at least one of said opening timing and closing timing of said valve based on a control value; and control value deciding means for setting said control value according to said present timing, said optimum timing and said direction to which said phase is to be changed, thereby causing said present timing to become said optimum timing, wherein an absolute value of said control value corresponding to a phase difference between said present timing and said optimum timing differs depending on a polarity of said phase difference even if an absolute value of phase differences of opposite polarities are identical.

2. A valve timing control apparatus according to claim 1, wherein said control value deciding means changes said control value according to a polarity of said phase difference.

3. A valve timing control apparatus according to claim 2, wherein said control value deciding means changes said control value by changing a conversion gain for said phase difference versus said control value.

4. A valve timing control apparatus according to claim 1, wherein said control value deciding means changes a magnitude of said control value according to a speed of said engine.

5. A valve timing control apparatus according to claim 4, wherein said control value deciding means changes an arithmetic procedure for deciding said control value according to said speed of said engine.

6. A valve timing control apparatus according to claim 5, wherein said control value deciding means changes said control value by changing a conversion gain for said phase difference versus said control value.

7. A valve timing control apparatus according to claim 1, wherein said control value deciding means varies a magnitude of said control value according to a temperature of said engine.

8. A valve timing control apparatus according to claim 1, wherein said control value deciding means varies a magnitude of said control value according to a temperature of oil in said engine.

9. A valve timing control apparatus for changing a timing of a valve driven by rotation of a camshaft by varying a rotational phase of said camshaft relative to a crankshaft in an internal combustion engine, said valve timing control apparatus comprising: a first sensor detecting an operating condition of said engine;

a camshaft position sensor detecting a rotational position of said camshaft;

a crankshaft position sensor detecting a rotational position of said crankshaft;

an electronic control unit receiving an output of said first sensor, said camshaft position sensor and said crankshaft position sensor, wherein said electronic control unit:

calculates an optimum timing of said valve based on said operating condition of said engine detected by said first sensor, detects a present timing of said valve corresponding to a rotational phase difference between said rotational position of said camshaft and said rotational position of said crankshaft, determines which direction to change said rotational phase relationship between said camshaft and said crankshaft in order to change said present timing to said optimum timing, and calculates a control value used to control said timing of said valve, wherein a magnitude of said control value is larger when said electronic control unit determines that an increase in said timing of said valve is required to achieve said optimum timing than when said electronic control unit determines that a decrease in said timing of said valve is required to achieve said optimum timing; and a control value assembly for varying said timing of said valve based on a signal provided by said electronic control unit.

* * * * *